United States Patent
Yoshida et al.

(10) Patent No.: US 8,451,476 B2
(45) Date of Patent: May 28, 2013

(54) IMAGE PROCESSING APPARATUS, IMAGE PROCESSING METHOD, AND COMPUTER PROGRAM PRODUCT

(75) Inventors: Tomoyuki Yoshida, Tokyo (JP); Hiroaki Fukuda, Tokyo (JP)

(73) Assignee: Ricoh Company, Limited, Tokyo (JP)

( * ) Notice: Subject to any disclaimer, the term of this patent is extended or adjusted under 35 U.S.C. 154(b) by 978 days.

(21) Appl. No.: 12/382,471

(22) Filed: Mar. 17, 2009

(65) Prior Publication Data

US 2009/0237686 A1 Sep. 24, 2009

(30) Foreign Application Priority Data

Mar. 18, 2008 (JP) .................................. 2008-069413

(51) Int. Cl.
*G06K 1/10* (2006.01)
(52) U.S. Cl.
USPC ............ 358/1.15; 358/1.9; 358/540; 358/518
(58) Field of Classification Search
None
See application file for complete search history.

(56) References Cited

U.S. PATENT DOCUMENTS

| | | | |
|---|---|---|---|
| 2007/0030504 A1* | 2/2007 | Kawamoto et al. | 358/1.9 |
| 2007/0058224 A1* | 3/2007 | Kawamoto et al. | 358/518 |
| 2007/0070438 A1* | 3/2007 | Yoshida et al. | 358/448 |
| 2008/0170257 A1* | 7/2008 | Fukuda | 358/1.15 |
| 2008/0186543 A1* | 8/2008 | Harigae | 358/3.24 |
| 2009/0161136 A1* | 6/2009 | Li et al. | 358/1.13 |
| 2009/0237714 A1* | 9/2009 | Fukuda et al. | 358/1.15 |

FOREIGN PATENT DOCUMENTS

| | | | |
|---|---|---|---|
| JP | 06-332997 | | 12/1994 |
| JP | 07-078245 | | 3/1995 |
| JP | 2000-165655 | | 6/2000 |
| JP | 2001-223828 | * | 8/2001 |
| JP | 3647347 | | 2/2005 |
| JP | 2006-252154 | | 9/2006 |

OTHER PUBLICATIONS

Abstract of JP 2001-223828 published Aug. 17, 2001.

* cited by examiner

*Primary Examiner* — Twyler Haskins
*Assistant Examiner* — Helen Q Zong
(74) *Attorney, Agent, or Firm* — Harness, Dickey & Pierce, P.L.C.

(57) ABSTRACT

An image processing unit includes a first image processing unit that processes image data from a reading unit and a second image processing unit that processes image data from either one of the first image processing unit and a storing unit. A control unit determines a processing to be performed on the image data by the second image processing unit depending on a result of a processing performed on the image data by the first image processing unit, and selects an image processing route depending on a processing to be performed on the image data by the second image processing unit.

12 Claims, 7 Drawing Sheets

IMAGE PROCESSING APPARATUS, IMAGE PROCESSING METHOD, AND COMPUTER PROGRAM PRODUCT

CROSS-REFERENCE TO RELATED APPLICATIONS

The present application claims priority to and incorporates by reference the entire contents of Japanese priority document 2008-069413 filed in Japan on Mar. 18, 2008.

BACKGROUND OF THE INVENTION

1. Field of the Invention

The present invention relates to a technology for processing image data obtained by reading an image by an image reading unit.

2. Description of the Related Art

In recent years, with the development of an image reading device that includes a line sensor that is formed with a photoelectric conversion element such as a charge-coupled device (CCD) and the development of a writing device that uses laser irradiation, a copier system has made an advancement from an analog copier to a digital copier that creates a copy of an image using digitalized image data of an image. The digital copier has improved the compatibility with other digital devices that process digitalized image data. That has resulted in incorporating various functions, such as a copier function, a facsimile (FAX) function, a printer function, and scanner function, in one device, which is known as a multifunction peripheral (MFP).

Moreover, with the advancement in the MFP-related technology (e.g., increase in storage capacity and decrease in manufacturing cost of a memory device such as a hard disk drive (HDD), increase in communication speed in a communication technique such as a network communication, enhancement in throughput of a central processing unit (CPU), enhancement in an image processing technique such as a data compression technique for digital image data, etc., a wide variety of functions is being installed in the MFP. Consequently, the usage of the MFP is also getting more diversified. For example, a compact-sized MFP can be placed near a personal computer (PC) such that a user can use various functions of the MFP. A medium-sized MFP can be shared by a plurality of PCs, such as in units of department or section in a company, to make use of its relatively sufficient productivity along with functions such as sorting, punching, and stapling. A large-sized MFP having high productivity, high quality, and a variety of functions can be used in a department that mainly provides a copy-related service in a company or in a company that are regularly engaged in the copy-related service.

In this way, the MFP has been diversified. Some functions are sharable among the MFPs of different classes, while other functions are uniquely required in the MFP of a particular class. For example, the large-sized MFP is desired to perform finishing processes such as punching, stapling, and folding upon completion of printing or perform processes of copying and electronic filing in a simultaneous manner. On the other hand, the compact-sized MFP is desired to have enhanced Internet FAX function and PC-FAX function or perform high-quality image printing on a specific paper for personal use.

For such a diversified MFP market, the MFP has been developed and provided with a system that includes a set of functions unique to each class. Meanwhile, it is desired to convey information in a faster, accurate, reliable, easy-to-understand, and effective manner considering the importance of the information in business. With the advent of a technology such as increase in speed of a communication technique, increase in storage capacity and reduction in cost and size of a memory device, and enhancement in PC performance, more and more new functions are being provided for effectively processing digital data. Particularly in the MFP that processes digital image data, more and more new functions are being provided and integrated.

For example, Japanese Patent Application Laid-open No. 2000-165655 discloses an image processing apparatus that enables a wide variety of image synthesis due to its ability to handle a wider zoom ratio and eases restrictions on the use of readable image area due to the storage capacity of a memory.

Japanese Patent Application Laid-open No. H07-78245 discloses an image processing apparatus that can perform high-speed image processing without causing a degradation of image quality even without a page memory for a full-sized image.

Meanwhile, as described above, the compact-sized MFP can be placed near a PC such that a user can use the MFP for various functions. Thus, such compact-sized MFP has become popular among different types of users such as users in small offices/home offices (SOHO), home users, users at mid-size offices, and users at large offices. That has resulted in diversification of user demands regarding functions of the compact-sized MFP. Because of the continuous development of new MFP functions, the configuration of the compact-sized MFP has become more complex. As a result, it is becoming increasingly difficult to maintain low manufacturing cost, which is a feature advantage of the compact-sized MFP, while keeping up with the new MFP functions.

As described above, the image forming apparatus disclosed in Japanese Patent Application Laid-open No. 2000-165655 eases restrictions on the use of readable image area that is restricted due to the storage capacity of a memory. For that, the image forming apparatus switches a mode of zoom processing according to the amount of usable memory or according to whether an image rotation is performed with the use of the memory. However, because such easing of restrictions does not correspond to the nature of the image processing, it is difficult to constantly perform the image processing appropriate for a given condition.

As described above, the image processing apparatus disclosed in Japanese Patent Application Laid-open No. H07-78245 performs image processing even when the page memory for a full-sized image is not installed therein. For that, the image forming apparatus determines, depending on the size of image data to be processed, whether to use a frame memory installed therein as the page memory or as an image registration memory. However, because the abovementioned method does not correspond to the nature of image processing, it is difficult to constantly perform the image processing appropriate for a given condition.

SUMMARY OF THE INVENTION

It is an object of the present invention to at least partially solve the problems in the conventional technology.

According to one aspect of the present invention, there is provided an image processing apparatus including an image reading unit that reads an image of an original to obtain image data; a storing unit that stores therein image data; an image processing unit that performs an image processing on the image data from either one of the reading unit and the storing unit; a color-determination-mode setting unit that sets an automatic color determination mode for automatically determining whether the original is a color original or a monochrome original; and a control unit that controls the image reading unit, the image processing unit, the storing unit, and the color-determination-mode setting unit. The image processing unit includes a first image processing unit that processes the image data from the reading unit, and a second image processing unit that processes image data from either one of the first image processing unit and the storing unit, the control unit selects a processing route from among a first image-processing route in which the image data is processed by the first image processing unit and the second image processing unit and is stored in the storing unit and a second image-processing route in which the image data is once processed by the first image processing unit and stored in the storing unit, and then the image data from the storing unit is processed by the second image processing unit and stored in the storing unit, and determines a processing to be performed on the image data by the second image processing unit depending on a result of a processing performed on the image data by the first image processing unit, and the control unit selects the processing route depending on a processing to be performed on the image data by the second image processing unit.

Furthermore, according to another aspect of the present invention, there is provided an image processing method including reading an image of an original to obtain image data; processing at least the image data read at the reading; storing therein the image data processed at the processing; setting an automatic color determination mode for automatically determining whether the original is a color original or a monochrome original; and controlling the reading, the processing, the storing, and the setting. The processing includes first processing the image data read at the reading, and second processing either one of the image data stored at the storing and image data processed at the first processing, the controlling includes selecting a processing route from among a first image-processing route in which the image data is processed at the first processing and the second processing and is stored at the storing and a second image-processing route in which the image data is once processed at the first processing and stored at the storing, and then the image data stored at the storing is processed at the second processing and stored at the storing, and determining a processing to be performed on the image data at the second processing depending on a result of a processing performed on the image data at the first processing, and the controlling further includes selecting the processing route depending on a processing to be performed on the image data at the second processing.

Moreover, according to still another aspect of the present invention, there is provided a computer program product including a computer-usable medium having computer-readable program codes embodied in the medium. The program codes when executed cause a computer to execute reading an image of an original to obtain image data; processing at least the image data read at the reading; storing therein the image data processed at the processing; setting an automatic color determination mode for automatically determining whether the original is a color original or a monochrome original; and controlling the reading, the processing, the storing, and the setting. The processing includes first processing the image data read at the reading, and second processing either one of the image data stored at the storing and image data processed at the first processing, the controlling includes selecting a processing route from among a first image-processing route in which the image data is processed at the first processing and the second processing and is stored at the storing and a second image-processing route in which the image data is once processed at the first processing and stored at the storing, and then the image data stored at the storing is processed at the second processing and stored at the storing, and determining a processing to be performed on the image data at the second processing depending on a result of a processing performed on the image data at the first processing, and the controlling further includes selecting the processing route depending on a processing to be performed on the image data at the second processing.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Exemplary embodiments of the present invention are described in detail below with reference to the accompanying drawings. The present invention is not limited to these exemplary embodiments.

FIGS. 1 to 4 are diagrams for explaining an exemplary configuration of an image processing apparatus 20 according to a first embodiment of the present invention. The image processing apparatus 20 is a digital color MFP (hereinafter, "MFP 20") having various functions including a copier, a facsimile (FAX), a printer, and an image distribution (distribution of a scanned image or an image input by the printer or the FAX).

Figure 1:
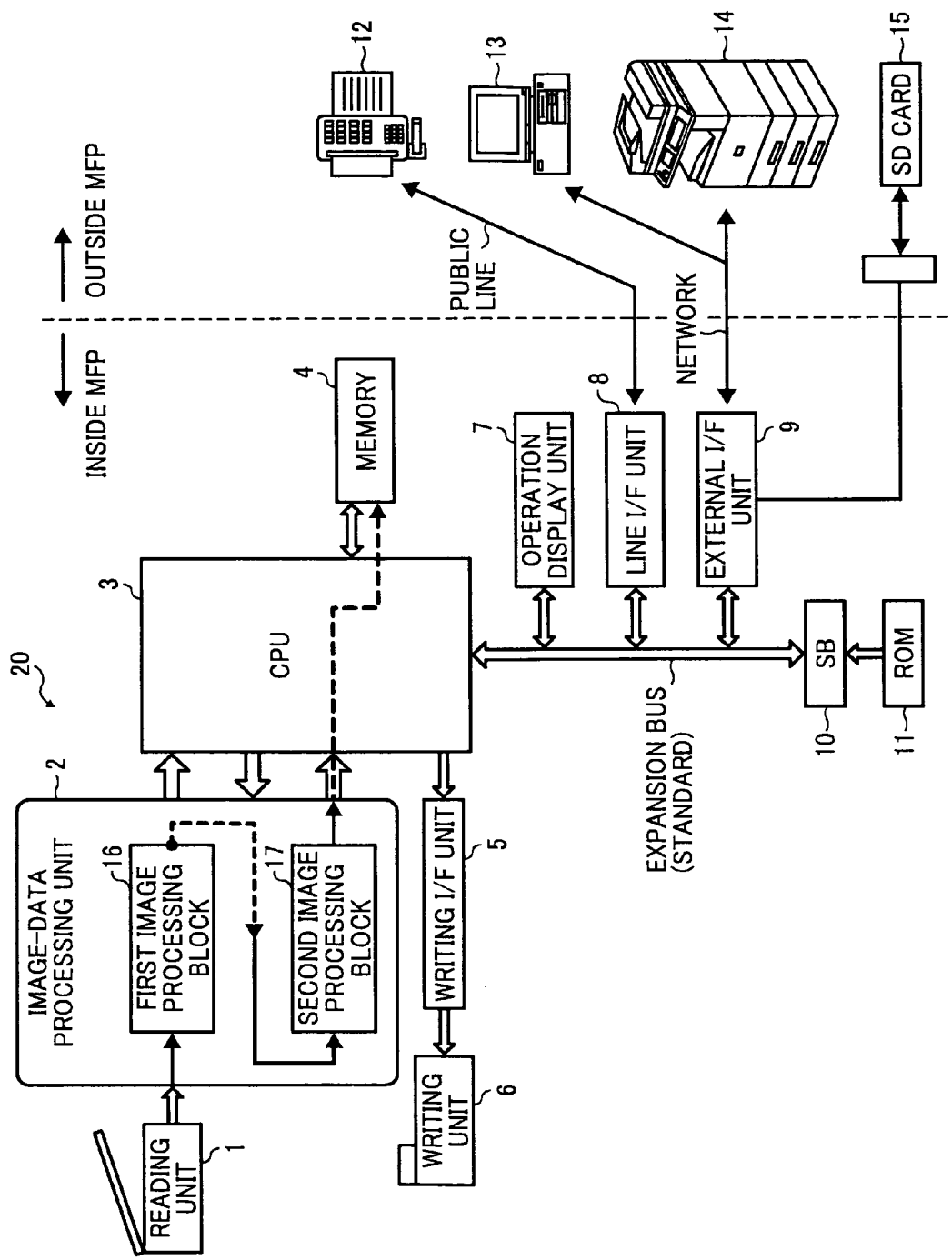
FIGS. 1 and 2 are block diagrams for explaining an exemplary configuration of an MFP according to a first embodiment of the present invention.
Figure 2:
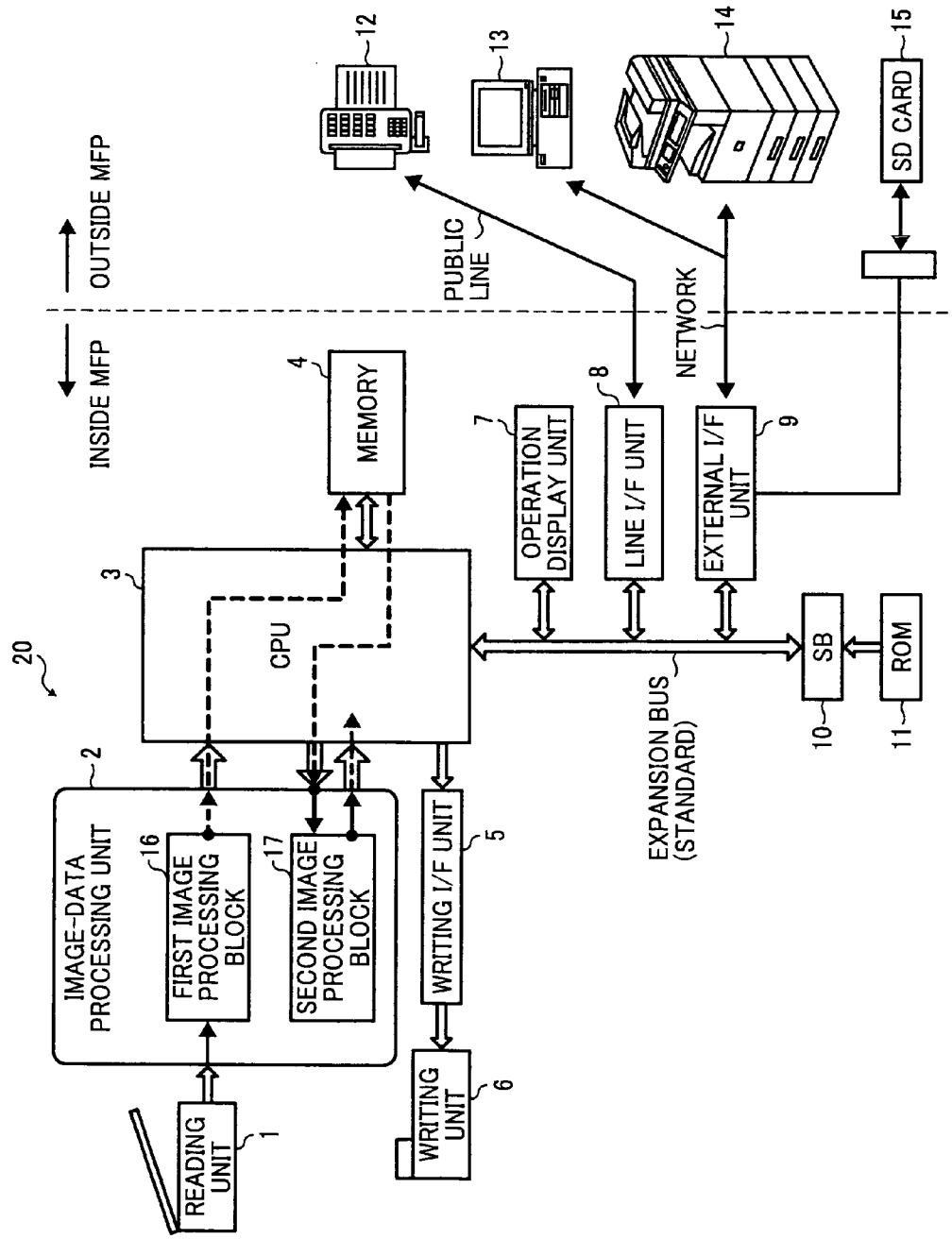
Figure 3:
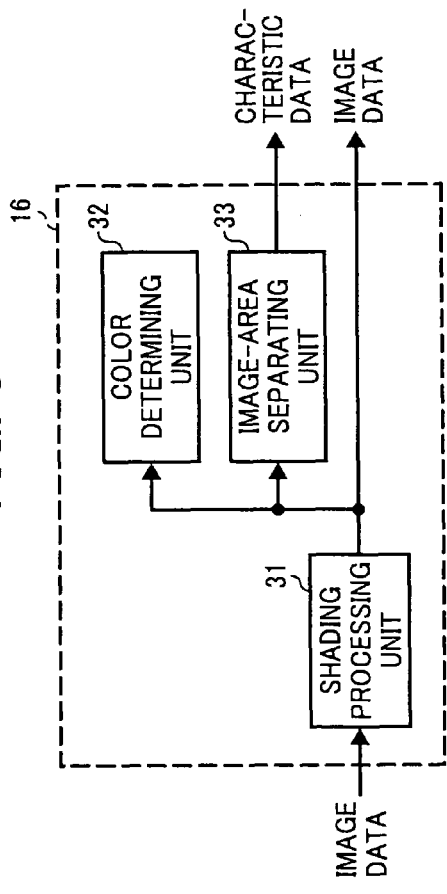
FIG. 3 is a block diagram for explaining an exemplary configuration of a first image processing block of the MFP shown in FIGS. 1 and 2.
Figure 4:
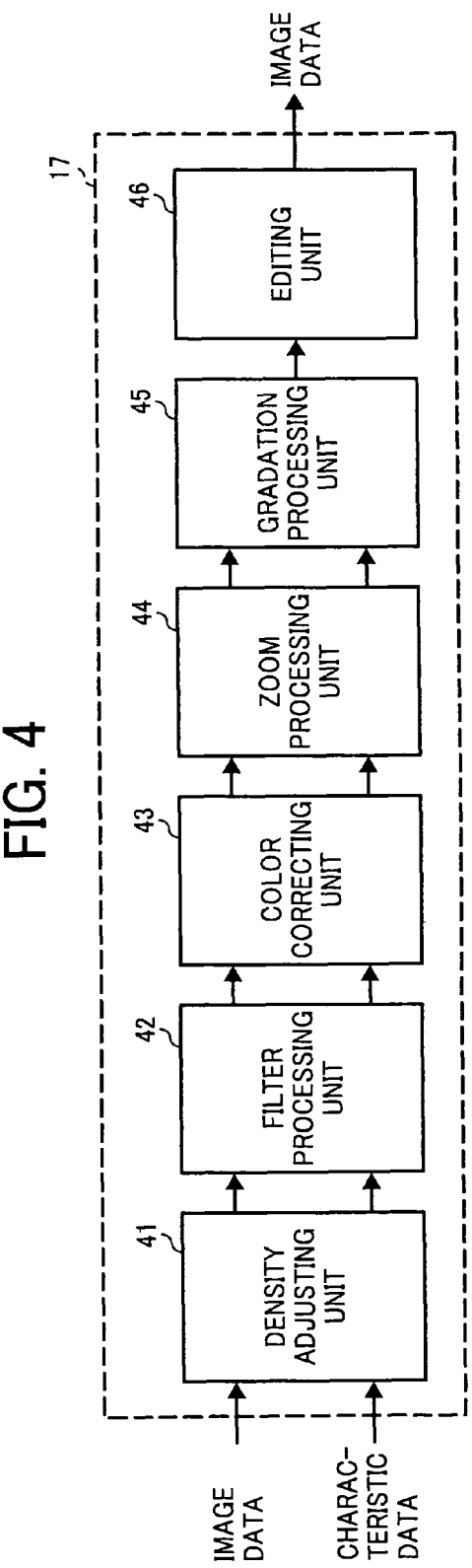
FIG. 4 is a block diagram for explaining an exemplary configuration of a second image processing block of the MFP shown in FIGS. 1 and 2.

FIGS. 1 and 2 are block diagrams for explaining an exemplary configuration of the MFP 20. FIG. 3 is a block diagram for explaining an exemplary configuration of a first image processing block 16 in the MFP 20. FIG. 4 is a block diagram for explaining an exemplary configuration of a second image processing block 17 in the MFP 20. As shown in FIGS. 1 and 2, the MFP 20 includes a reading unit 1 that obtains image data from an original, an image-data processing unit 2 that is divided into the first image processing block 16 and the second image processing block 17, a central processing unit (CPU) 3 that controls operations of the MFP 20, a memory 4 used to store image data, a writing interface (I/F) unit 5, a writing unit 6, an operation display unit 7 that is used as an automatic color-determination unit and an image-quality-mode selecting unit, a line I/F unit 8, an external I/F unit 9, a south bridge (SB) 10, a read only memory (ROM) 11, and a slot for inserting a secure digital (SD) card 15. Moreover, the MFP 20 is connected to a FAX device 12 via a telephone line and connected to a PC 13 and a digital color MFP 14 (hereinafter, simply "MFP 14") via a network.

The reading unit 1 includes a line image sensor that is formed with a photoelectric conversion element such as a CCD (not shown), an analog-to-digital (A/D) converting circuit (not shown), and a driving circuit (not shown) that drives the photoelectric conversion element and the A/D converting circuit. The reading unit 1 scans an original set therein to obtain image density information of the original, generates 8-bit-based RGB digital image data by using the image density information, and outputs the image data to the image-data processing unit 2.

The image-data processing unit 2 performs various image processing tasks with respect to the image data output by the reading unit 1. As described above, the image-data processing unit 2 is divided into the first image processing block 16 and the second image processing block 17. The feature of the MFP 20 is that the CPU 3 can switch a connection with the first image processing block 16 and a connection with the second image processing block 17 such that image processing can be performed via various different image processing routes. The configuration of the image-data processing unit 2 is described later in detail.

The CPU 3 is a microprocessor that controls the operations of the MFP 20 in entirety. The CPU 3 is an integrated CPU, which has become popular in recent years, in which a CPU core unit is provided with an additional function. For example, an RM1100 microprocessor provided by PMC-Sierra Incorporation is used as the integrated CPU. An RM1100 microprocessor is equipped with an integrated bus connection facility for connecting a plurality of PCI-Express buses or dual-in-line memory modules (DIMMs) by using a crossbar switch.

The memory 4 is a fast-access and volatile memory used to temporarily store therein data for absorbing the difference in processing speed during data communication between the CPU 3 and the other components in the MFP 20. In addition, the memory 4 is used to temporarily store computer programs or intermediary processing data used when the CPU 3 controls the operations of the MFP 20. To enable high-speed processing in the MFP 20, the CPU 3 boots the system of the MFP 20 by using a boot program stored in the ROM 11 at the time of normal boot, and thereafter, performs processing by using computer programs loaded on the memory 4 that can be accessed at high speed. Moreover, the CPU 3 is able to freely perform read/write operations with respect to image data stored in the memory 4. In the present embodiment, in the MFP 20, a standardized DIMM, which is typically used in PCs, is used as the memory 4.

The writing I/F unit 5 receives CMYK digital image data (CMYK stands for a color model of cyan, magenta, yellow, and black) via the CPU 3 that includes a bus control function for PCI-Express buses. Subsequently, the writing I/F unit 5 performs bus-bridge processing to send the image data to a dedicated I/F for the writing unit 6.

The writing unit 6 performs an electrophotographic process on the CMYK image data by using a laser beam and prints the image data on a recording medium such as a print paper.

The operation display unit 7 is a user interface having a user display (e.g., a liquid crystal display (LCD)) and a switch unit. The operation display unit 7 functions as an automatic color-determination instructing unit used for instructing the MFP 20 to automatically determine whether the set original is a color original or a monochrome original and functions as an image-quality-mode selecting unit used to select an image quality mode of the MFP 20 based on the result of color determination performed in the first image processing block 16 (see FIGS. 5 to 8). The operation display unit 7 displays information about various states of the MFP 20 or various operational methods on the user display and detects key-switch input operations performed by the user. In the present embodiment, the operation display unit 7 is connected to the CPU 3 via a PCI-Express bus.

The line I/F unit 8 is used to connect the PCI-Express bus to a telephone line. That enables the MFP 20 to communicate data with the FAX device 12 via the telephone line.

The external I/F unit 9 is used to connect the PCI-Express bus to an external device. With the external I/F unit 9, the MFP 20 can exchange various data with the PC 13 or the MFP 14. In the present embodiment, a network such as Ethernet (registered trademark) and an external medium I/F (e.g., an SD card slot) is used as a connection I/F between the external I/F unit 9 and the PC 13. That enables the MFP 20 to communicate data with external devices such as the PC 13, the MFP 14, and the SD card 15 via the network or the external medium I/F.

The SB 10 is one of the chips used in a northbridge/southbridge chipset architecture and is a universal electronic device. The SB 10 is configured as a universal circuit with a bus bride function, which is typically used for configuring a CPU system including the PCI-Express bus and an industrial standard architecture (ISA) bridge. In the present embodiment, the SB 10 bridges the CPU 3 to the ROM 11.

The ROM 11 is a memory used to store therein various programs (including the boot program) used by the CPU 3 to control the operations of the MFP 20.

The FAX device 12 is a typical FAX device that performs data communication with the MFP 20 via the telephone line.

The PC 13 is installed with application programs or drivers that the user can use to control the operations of the MFP 20 or to perform input-output of image data with respect to the MFP 20.

The MFP 14 is another digital color MFP connected to the MFP 20 via the network.

When the user inserts an external memory device such as the SD card 15 or a Compact Flash (registered trademark) card, which is used to store digital data such as image data, then input/output of image data with respect to the MFP 20 is performed via the external medium I/F.

Given below is the description of the image-data processing unit 2, which has a distinguishing configuration in the MFP 20. That is, as shown in FIGS. 1 and 2, the image-data processing unit 2 is divided into the first image processing block 16 and the second image processing block 17.

The first image processing block 16 receives RGB image data (RGB is a color model of red, blue, and green) from the reading unit 1 via a dedicated I/F, performs various image processing tasks on the image data, and, according to an instruction from the CPU 3, outputs the image data to either one of the second image processing block 17 and the CPU 3.

The first image processing block 16 outputs the image data to the second image processing block 17 via an internal dedicated I/F in the image-data processing unit 2 (see FIG. 1), while the first image processing block 16 outputs the image data to the CPU 3 (and the memory 4) via a PCI-Express bus (see FIG. 2).

The second image processing block 17 receives, according to an instruction from the CPU 3, RGB image data from the first image processing block 16 via the internal dedicated I/F or from the memory 4 via the CPU 3. Subsequently, the second image processing block 17 performs various image processing tasks on the image data, and outputs the image data to the memory 4 via the CPU 3 (see FIGS. 1 and 2).

Thus, the feature of the MFP 20 is that the CPU 3 can select between two image processing routes, namely, a first image-processing route and a second image-processing route for processing image data. In the first image-processing route, the image data read by the reading unit 1 is subjected to image processing in the first image processing block 16 and in the second image processing block 17 before being stored in the memory 4 (see FIG. 1). In the second image processing route, the image data processed in the first image processing block 16 is once stored in the memory 4. Then, the image data stored in the memory 4 is subjected to image processing in the second image processing block 17 and output back to the memory 4 (see FIG. 2).

Because of such a configuration, the image processing tasks to be performed in the second image processing block 17 can be determined based on the image processing tasks performed in the first image processing block 16. Moreover, it becomes possible to determine whether the second image processing block 17 should receive image data from the first image processing block 16 or from the memory 4.

Given below is the description of a copying process, which is a representative process performed by the MFP 20, to explain the image processing tasks performed in the first image processing block 16 and in the second image processing block 17.

First, the user sets an original in the reading unit 1, and operates the operation display unit 7 to input a desired copying mode and an instruction to start the copying process.

The operation display unit 7 converts the user-specified information into internal control command data of the MFP 20 and sends the control command data to the CPU 3 via the PCI-Express bus. Subsequently, based on the control command data about starting the copying process, the CPU 3 executes a computer program for copying and performs necessary settings for copying. Meanwhile, as described above, the operation display unit 7 functions as an automatic color-determination instructing unit that can be used for instructing the MFP 20 to automatically determine whether the set original is a color original or a monochrome original. Given below is the sequence of operations performed in the copying process.

During the copying process, first, the reading unit 1 scans the set original, generates 8-bit-based RGB digital image data, and outputs the image data to the image-data processing unit 2. In the image-data processing unit 2, the first image processing block 16 and the second image processing block 17 perform various image processing tasks on the image data.

The first image processing block 16 includes a shading processing unit 31, a color determining unit 32, and an image-area separating unit 33 (see FIG. 3).

The shading processing unit 31 corrects the variation in the image data caused by fluctuation in illumination of each scanning line with respect to the image data or the fluctuation in photoelectric sensitivity of a photoelectric conversion element such as the CCD with respect to each pixel of the image data. The shading processing unit 31 outputs the corrected image data to the color determining unit 32 and the image-area separating unit 33.

Upon receiving the image data from the shading processing unit 31, the color determining unit 32 determines whether the set original is a color original or a monochrome original by using color information of the original. The result of color determination ends upon completion of reading the original.

Similarly, upon receiving the image data from the shading processing unit 31, the image-area separating unit 33 extracts characteristic areas in the original. For example, the image-area separating unit 33 extracts halftone dots generated due to printing, extracts character edges, determines whether the image data is chromatic image data or achromatic image data, or determines whether the background image in the image data is white. The result of characteristic area extraction is output as characteristic data for each pixel of the image data.

Thus, in all, the first image processing block 16 outputs the image data corrected by the shading processing unit 31 and the characteristic data obtained by the image-area separating unit 33.

In the first image processing route shown in FIG. 1, the corrected image data and the characteristic data is output to the second image processing block 17.

The second image processing block 17 includes a density adjusting unit 41, a filter processing unit 42, a color correcting unit 43, a zoom processing unit 44, a gradation processing unit 45, and an editing unit 46.

The density adjusting unit 41 switches between an activated state and a deactivated state according to the user setting. When in the activated state, the density adjusting unit 41 detects a fluctuation range of image density in the original by using the received image data. Subsequently, the density adjusting unit 41 adjusts image density range to be reproduced and outputs the adjusted image density range. For example, in the case of an original (e.g., a newspaper) having dense background area, the density adjusting unit 41 skips image density adjustment of the background area and outputs the remaining image data to the filter processing unit 42. Moreover, the density adjusting unit 41 uses only the image data and not the characteristic data.

The filter processing unit 42 assumes the role of image quality adjustment by converting spatial frequency of the image data. In the first embodiment, the filter processing unit 42 performs suitable filter processing with respect to each characteristic area in the original by using the characteristic data. For example, to enhance sharpness of characters in an image, the filter processing unit 42 performs modulation transfer function (MTF) correction of character edges; while to prevent occurrence of a moire pattern, the filter processing unit 42 performs smoothing of halftone dots.

The color correcting unit 43 performs color conversion of image data such that the image data is in accordance with the color space properties of the output destination. In the copying process, because the output destination of the image data is the writing unit 6, the color correcting unit 43 converts RGB image data to CMYK image data as the specification of the writing unit 6. Moreover, the color correcting unit 43 performs color adjustment by using the characteristic data such that the color of the chromatic portion in the original is enhanced and the color of the achromatic portion in the original is muted. Meanwhile, when the image data is to be output to the PC 13 as the output destination via the external I/F unit 9, then it is possible to perform color conversion into sRGB color space, which is a standardized color space to which the PC 13 is compatible.

The zoom processing unit 44 performs zoom processing (resolution conversion) of the image data according to a zoom ratio (zoom-in/zoom-out) specified in the copying process. Meanwhile, although the zoom processing unit 44 does not use the characteristic data, the characteristic data is also subjected to zoom processing to maintain synchronization with the image data.

The gradation processing unit 45 performs gradation processing of the image data according to the gradation processing capacity of the writing unit 6. In the present embodiment, the gradation processing unit 45 converts the gradation depth (number of bits) of the image data from 8 bits to 2 bits according to the gradation capacity of the writing unit 6 while changing printer gamma and a method of error diffusion processing for each characteristic area by using the characteristic data.

The editing unit 46 performs editing of image data (e.g., removing margin space, removing center space) as specified by the user for the copying process.

Thus, the image processing tasks performed in the second image processing block 17 results in generation of CMYK image data that is suitable for copying. The CMYK image data output by the second image processing block 17 is stored in the memory 4 via the CPU 3.

Subsequently, the CMYK image data stored in the memory 4 is sent to the writing unit 6 via the CPU 3 and the writing I/F unit 5. The writing unit 6 prints the CMYK image data on a recording medium to produce a copy of the original.

In this way, according to the first embodiment, the CPU 3 can select between the first image-processing route and the second image-processing route. In the first image-processing route, the image data is processed in the first image processing block 16 and in the second image processing block 17 before being stored in the memory 4. On the other hand, in the second image processing route, the image data processed in the first image processing block 16 is once stored in the memory 4. Then, the image data stored in the memory 4 is subjected to image processing in the second image processing block 17 and output back to the memory 4. Such a configuration of the MFP 20 allows execution of a variety of user-requested functions at a low manufacturing cost. For example, because the image processing tasks to be performed in the second image processing block 17 can be determined according to the result of color determination performed in the first image processing block 16, it becomes possible to deal with a variety of user-requested functions at a low manufacturing cost. Moreover, if the processing speed of various conversion processes performed in the second image processing block 17 is not satisfactory, then the memory 4 can be used as a buffer for the second image processing block 17. That allows execution of a variety of user-requested functions at a low manufacturing cost. Thus, the MFP 20 offers a solution to the conventional problem in which an image processing apparatus has constraints in performing image processing tasks because of the diversity in the processing environment (different types of image processing modes, different reading speeds of image reading devices, different storage capacities, etc.).

Given below is the description according to a second embodiment of the present invention. According to the second embodiment, when automatic color determination is instructed, the image processing task to be performed by the color correcting unit 43 in the second image processing block 17 is determined based on the result of color determination performed by the color determining unit 32 in the first image processing block 16. The description below is given for a copying process.

Figure 5:
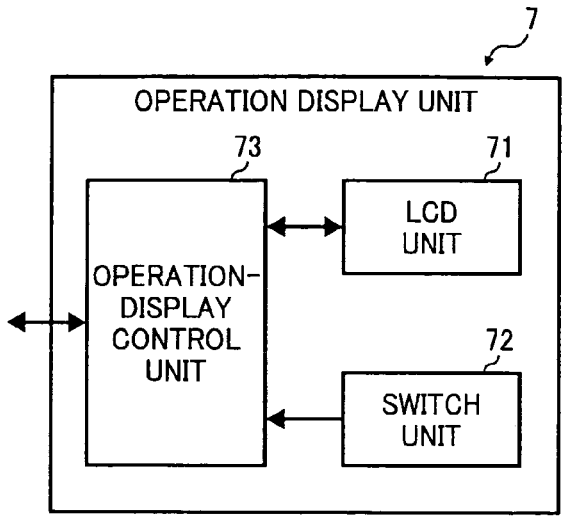
FIG. 5 is a block diagram for explaining an exemplary configuration of an operation display unit of the MFP shown in FIGS. 1 and 2.

FIG. 5 is a block diagram for explaining an exemplary configuration of the operation display unit 7. The operation display unit 7 functions as an interface between the user and the MFP 20, and includes an LCD circuit 71 that is used to display various states of the MFP 20 or various operational methods to the user, a switch unit 72 that detects key-switch input operations performed by the user, and an operation-display control unit 73 that controls the operations of the LCD circuit 71 and the switch unit 72.

The LCD circuit 71 is a modular circuit in which a touch panel is embedded on the LCD surface. The user can perform input operations from the touch panel. An LCD device (not shown) in the LCD circuit 71 is driven to detect the input operations from the touch panel. The switch unit 72 includes a group of key switches arranged on the operation display unit 7 and a driving circuit (not shown). The operation-display control unit 73 performs data communication with the CPU 3 via the PCI-Express bus and controls the operations of the LCD circuit 71 and the switch unit 72. More particularly, when the operation-display control unit 73 detects an input from the touch panel of the LCD circuit 71 or from the key switches in the switch unit 72, it converts the input into a semantically allocated control code and sends the control code to the CPU 3. Moreover, the operation-display control unit 73 interprets the instructions sent in the form of control codes by the CPU 3 and accordingly controls the LCD circuit 71 to perform various displays for the user.

Figure 6:
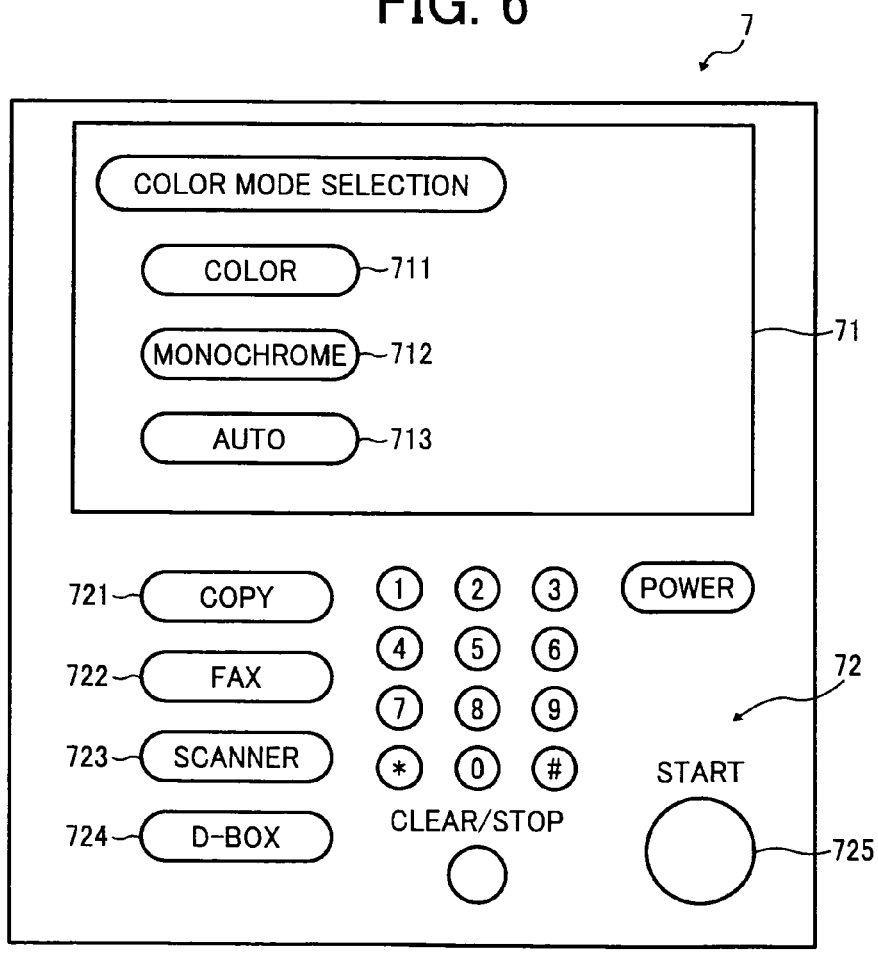
FIG. 6 is a schematic diagram of the operation display unit when automatic color determination is instructed in a second embodiment of the present invention.

FIG. 6 is a schematic diagram of the operation display unit 7 when automatic color determination is instructed in the second embodiment. First, the user sets an original in the reading unit 1 and then selects an "auto" button 713 from a "color mode selection" screen on the operation display unit 7. Subsequently, the user selects a "copy" button 721 and presses a "start" button 725.

The operation display unit 7 converts the user-specified information into internal control command data of the MFP 20 and sends the control command data to the CPU 3 via the PCI-Express bus. Subsequently, based on the control command data about starting the copying process, the CPU 3 executes a computer program for copying and performs necessary settings for copying. Moreover, the CPU 3 selects the second image processing route with respect to the image-data processing unit 2 (see FIG. 2).

In the second image processing route, the image data of the set original is subjected to image processing in the first image processing block 16 and, upon completion of reading of image data in the set original, the image data and the characteristic data is stored in the memory 4.

Then, the CPU 3 checks the result of color determination performed by the color determining unit 32 in the first image processing block 16 and accordingly determines the image processing task to be performed by the color correcting unit 43 in the second image processing block 17. More particularly, when the color determining unit 32 determines that the set original is a color original, the color correcting unit 43 performs RGB-to-CMYK conversion; while when the color determining unit 32 determines that the set original is a monochrome original, the color correcting unit 43 performs RGB-to-K conversion.

Lastly, the image data and the characteristic data stored in the memory 4 is output to the second image processing block 17 for further image processing and then output to the writing unit 6 via the writing I/F unit 5 for producing a copy of the original on a recording medium.

In this way, according to the second embodiment, when automatic color determination is instructed from the operation display unit 7, the image data read by the reading unit 1 is subjected to image processing only in the first image processing block 16 and then stored in the memory 4. Subsequently, the color correction processing performed in the second image processing block 17 with respect to the image data stored in the memory 4 is determined based on whether the set original is a color original or a monochrome original as determined by the color determining unit 32 in the first image processing block 16. That is, if the set original is a color original, the image data is output in color; while if the set original is a monochrome original, the image data is output in monochrome. Such a configuration of the MFP 20 allows execution of a variety of user-requested functions at a low manufacturing cost.

Given below is the description according to a third embodiment of the present invention. According to the third embodiment, when automatic color determination is instructed, the image processing task to be performed by the zoom processing unit 44 in the second image processing block 17 is determined based on the result of color determination performed by the color determining unit 32 in the first image processing block 16. The description below is given for a scanner distribution process in which image data read by the reading unit 1 is output to the PC 13.

Figure 7:
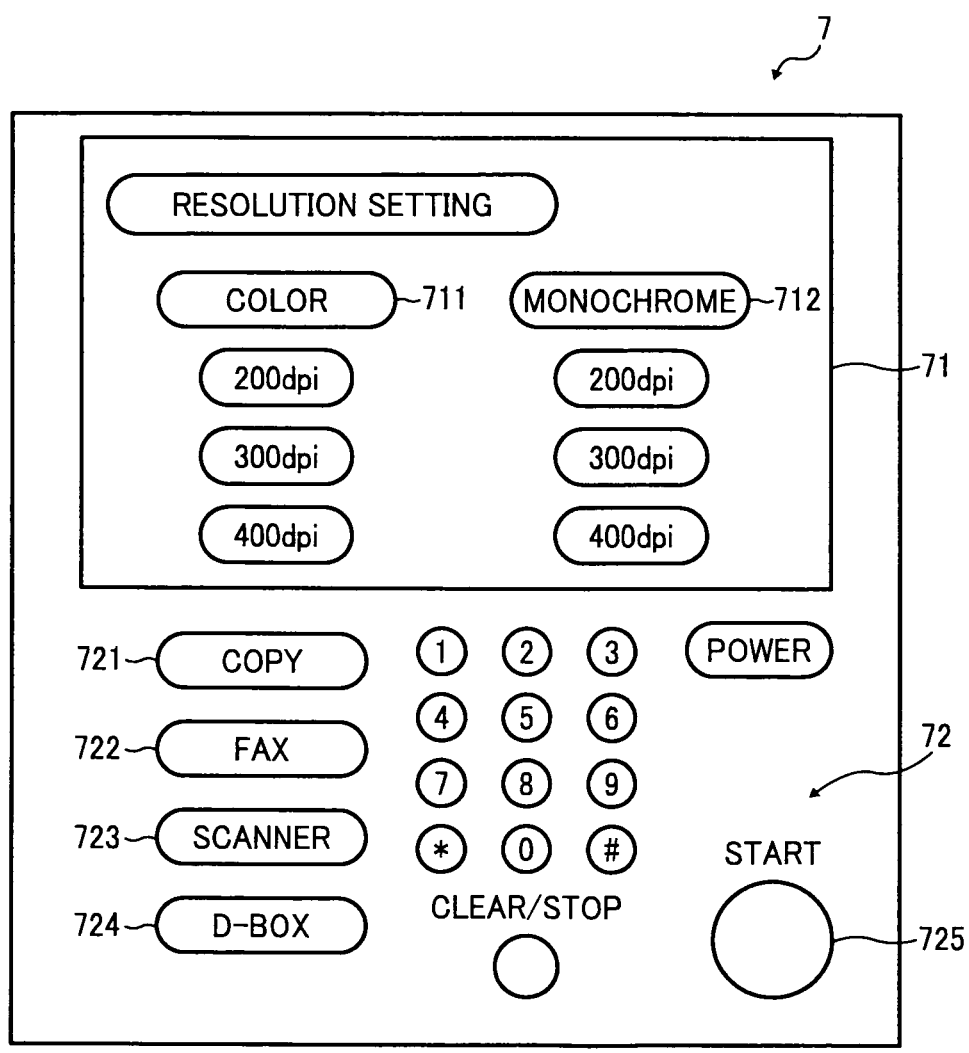
FIG. 7 is a schematic diagram of the operation display unit when automatic color determination is instructed in a third embodiment of the present invention.

FIG. 7 is a schematic diagram of the operation display unit 7 when automatic color determination is instructed in the third embodiment. In the case of scanner distribution, first, the user sets an original in the reading unit 1, and specifies resolution setting for scanner distribution in color and resolution setting for scanner distribution in monochrome by using a "color" button 711 and a "monochrome" button 712, respectively. Then, the CPU 3 stores the user-specified resolution setting.

Then, the user selects the "auto" button 713 from the color mode selection screen on the operation display unit 7 (see FIG. 6). Subsequently, the user selects a "scanner" button 723 and presses the "start" button 725.

The image data of the set original is subjected to image processing in the first image processing block 16 to obtain the processed image data and the characteristic data, which is then stored in the memory 4.

Depending on the color determination performed by the color determining unit 32 in the first image processing block 16, the CPU 3 determines the setting of the zoom processing unit 44 in the second image processing block 17. More particularly, when the color determining unit 32 determines that the set original is a color original, the CPU 3 sets the user-specified resolution setting for scanner distribution in color; while when the color determining unit 32 determines that the set original is a monochrome original, the CPU 3 sets the user-specified resolution setting for scanner distribution in monochrome.

Lastly, the image data and the characteristic data stored in the memory 4 is output to the second image processing block 17 for further image processing and then output to the PC 13 via the external I/F unit 9 thereby completing the scanner distribution process.

In this way, according to the third embodiment, when automatic color determination is instructed from the operation display unit 7, the image data read by the reading unit 1 is subjected to image processing only in the first image processing block 16 and then sent to the memory 4. Subsequently, the zoom processing unit 44 in the second image processing block 17 performs image processing based on whether the set original is a color original or a monochrome original as determined by the color determining unit 32 in the first image processing block 16. That is, if the set original is a color original, then the zoom processing unit 44 reduces the resolution for scanner distribution to reduce the volume of data; while if the set original is a monochrome original, then the zoom processing unit 44 increases the resolution for scanner distribution. Such a configuration of the MFP 20 allows execution of a variety of user-requested functions at a low manufacturing cost.

Given below is the description according to a fourth embodiment of the present invention. According to the fourth embodiment, when automatic color determination is instructed, the setting of the density adjusting unit 41 in the second image processing block 17 is determined based on the result of color determination performed by the color determining unit 32 in the first image processing block 16. The description below is given for a copying process.

Figure 8:
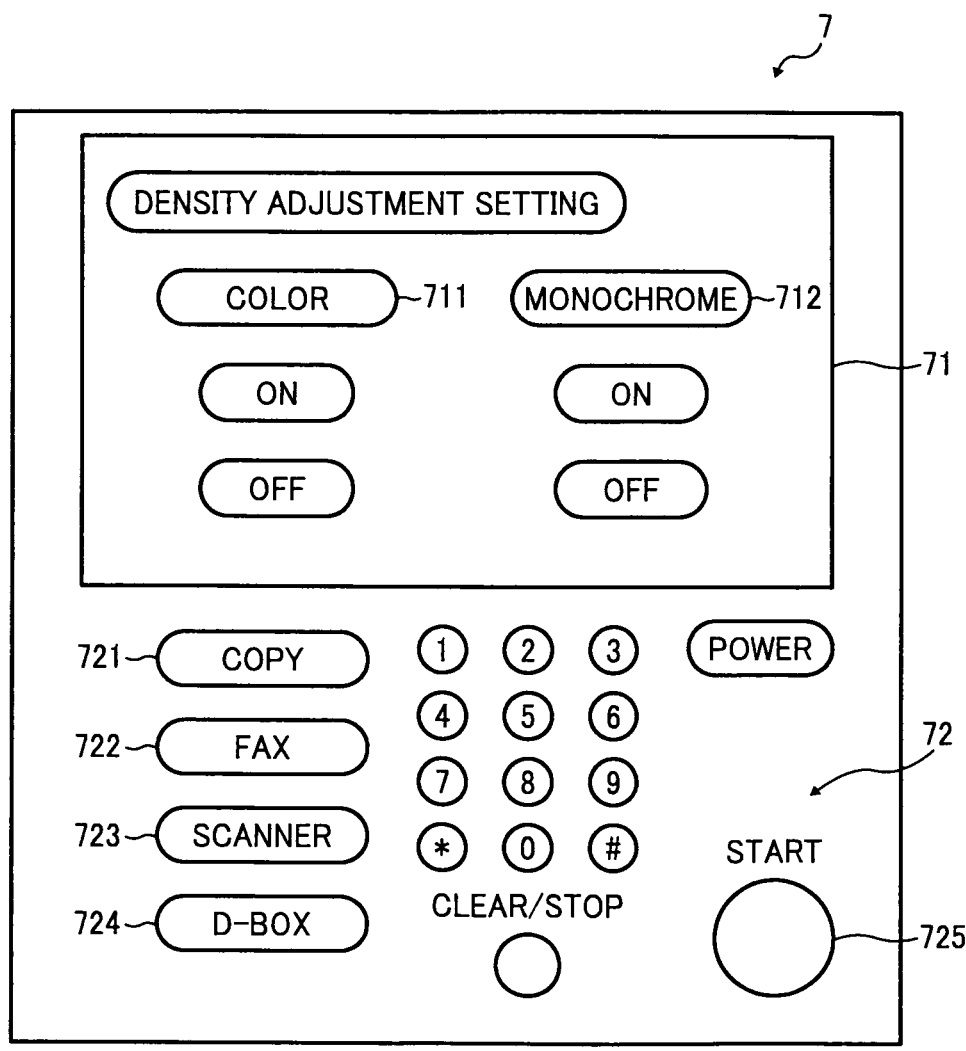
FIG. 8 is a schematic diagram of the operation display unit when automatic color determination is instructed in a fourth embodiment of the present invention.

FIG. 8 is a schematic diagram of the operation display unit 7 when automatic color determination is instructed in the fourth embodiment. The user activates/deactivates image density adjustment for color original and image density adjustment for monochrome original, and the CPU 3 stores the user-specified setting.

Then, the user sets the original in the reading unit 1 and selects the "auto" button 713 from the color mode selection screen on the operation display unit 7 (see FIG. 6). Subsequently, the user selects the "copy" button 721 and presses the "start" button 725.

The image data of the set original is subjected to image processing in the first image processing block 16 to obtain the processed image data and the characteristic data, which is then stored in the memory 4.

Depending on the color determination performed by the color determining unit 32 in the first image processing block 16, the CPU 3 determines the setting of the density adjusting unit 41 in the second image processing block 17. More particularly, when the color determining unit 32 determines that the set original is a color original, the CPU 3 sets image density adjustment for color original; while when the color determining unit 32 determines that the set original is a monochrome original, the CPU 3 sets image density adjustment for monochrome original.

Lastly, the image data and the characteristic data stored in the memory 4 is output to the second image processing block 17 for further image processing and then output to the writing unit 6 via the writing I/F unit 5 for producing a copy of the original on a recording medium.

In this way, according to the fourth embodiment, when automatic color determination is instructed from the operation display unit 7, the CPU 3 stores the image data processed only in the first image processing block 16 in the memory 4. Subsequently, the density adjusting unit 41 performs image processing of the image data stored in the memory 4 depending on whether the set original is a color original or a monochrome original as determined by the color determining unit 32 in the first image processing block 16. That is, if the set original is a color original, the density adjusting unit 41 does not perform image density adjustment such that it is possible to reproduce the exact colors of, e.g., a faint color background in the set original. On the other hand, if the set original is a monochrome original, the density adjusting unit 41 performs image density adjustment to prevent background fog when reproducing colors in the original (e.g., a newspaper). Such a configuration of the MFP 20 allows execution of a variety of user-requested functions at a low manufacturing cost.

Given below is the description according to a fifth embodiment of the present invention. According to the fifth embodiment, when automatic color determination is instructed, the setting of the filter processing unit 42 in the second image processing block 17 is determined based on the result of color determination performed by the color determining unit 32 in the first image processing block 16. The description below is given for a copying process.

First, the user sets the original in the reading unit 1 and selects the "auto" button 713 from the color mode selection screen on the operation display unit 7 (see FIG. 6). Subsequently, the user selects the "copy" button 721 and presses the "start" button 725.

The image data of the set original is subjected to image processing in the first image processing block 16 to obtain the processed image data and the characteristic data, which is then stored in the memory 4.

Depending on the color determination performed by the color determining unit 32 in the first image processing block 16, the CPU 3 determines the setting of the filter processing unit 42 in the second image processing block 17. More particularly, when the color determining unit 32 determines that the set original is a color original, the filter processing unit 42 reduces the extent of MTF correction to prevent occurrence of a moire pattern in the halftone dot area of the original; while when the color determining unit 32 determines that the set original is a monochrome original, the filter processing unit 42 increases the extent of MTF correction because the occurrence of a moire pattern is less likely. Lastly, the image data and the characteristic data stored in the memory 4 is output to the second image processing block 17 for further image processing and then output to the writing unit 6 via the writing I/F unit 5 for producing a copy of the original on a recording medium.

In this way, according to the fifth embodiment, when automatic color determination is instructed from the operation display unit 7, the CPU 3 stores the image data processed only in the first image processing block 16 in the memory 4. Subsequently, the filter processing unit 42 performs filter processing of the image data stored in the memory 4 based on whether the set original is a color original or a monochrome original as determined by the color determining unit 32 in the first image processing block 16. That is, if the set original is a color original, the filter processing unit 42 reduces the extent of sharpening the image data by taking into consideration the possibility that the set original includes a picture. On the other hand, if the set original is a monochrome original, the filter processing unit 42 increases the extent of sharpening the image data by taking into consideration the possibility that the set original includes a large number of characters. Such a configuration of the MFP 20 allows execution of a variety of user-requested functions at a low manufacturing cost.

Given below is the description according to a sixth embodiment of the present invention. According to the sixth embodiment, when automatic color determination is instructed, the setting of the gradation processing unit 45 in the second image processing block 17 is determined based on the result of color determination performed by the color determining unit 32 in the first image processing block 16. The description below is given for a copying process.

First, the user sets the original in the reading unit 1 and selects the "auto" button 713 from the color mode selection screen on the operation display unit 7 (see FIG. 6). Subsequently, the user selects the "copy" button 721 and presses the "start" button 725.

The image data of the set original is subjected to image processing in the first image processing block 16 to obtain the processed image data and the characteristic data, which is then stored in the memory 4.

Depending on the color determination performed by the color determining unit 32 in the first image processing block 16, the CPU 3 determines the setting of the gradation processing unit 45 in the second image processing block 17. More particularly, when the color determining unit 32 determines that the set original is a color original, the gradation processing unit 45 sets a smooth tone curve of printer gamma correction by taking into consideration a picture area in the set original; while when the color determining unit 32 determines that the set original is a monochrome original, the gradation processing unit 45 sets a sharp tone curve of printer gamma correction by giving more emphasis on the sharpening of characters than taking into consideration the picture area in the set original.

Lastly, the image data and the characteristic data stored in the memory 4 is output to the second image processing block 17 for further image processing and then output to the writing unit 6 via the writing I/F unit 5 for producing a copy of the original on a recording medium.

In this way, according to the sixth embodiment, when automatic color determination is instructed from the operation display unit 7, the CPU 3 stores the image data processed only in the first image processing block 16 in the memory 4. Subsequently, the gradation processing unit 45 performs gradation processing of the image data stored in the memory 4 based on whether the set original is a color original or a monochrome original as determined by the color determining unit 32 in the first image processing block 16. That is, if the set original is a color original, the gradation processing unit 45 increases the number of gradations by taking into consideration the possibility that the set original includes a picture. On the other hand, if the set original is a monochrome original, the gradation processing unit 45 reduces the number of gradations by taking into consideration the possibility that the set original includes a large number of characters. Such a configuration of the MFP 20 allows execution of a variety of user-requested functions at a low manufacturing cost.

Figure 9:
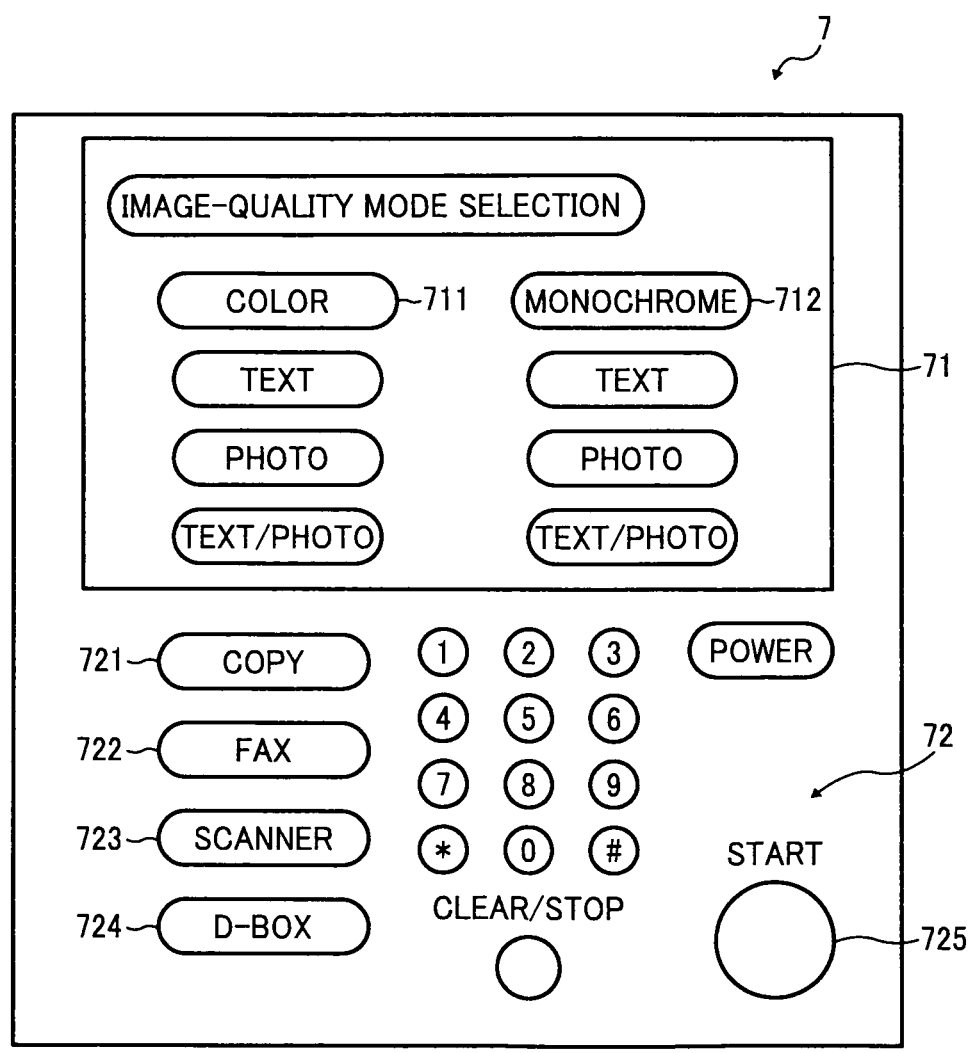
FIG. 9 is a schematic diagram of the operation display unit when automatic color determination is instructed in a seventh embodiment of the present invention.

Given below is the description according to a seventh embodiment of the present invention. According to the seventh embodiment, when automatic color determination is instructed, the setting of an image-quality mode selection screen shown in FIG. 9 is determined based on the result of color determination performed by the color determining unit 32 in the first image processing block 16. The description below is given for a copying process.

FIG. 9 is a schematic diagram of the operation display unit 7 when automatic color determination is instructed in the seventh embodiment. The CPU 3 stores the user-specified setting of image quality mode for color original and image quality mode for monochrome original.

Then, the user sets the original in the reading unit 1 and selects the "auto" button 713 from the color mode selection screen on the operation display unit 7 (see FIG. 6). Subsequently, the user selects the "copy" button 721 and presses the "start" button 725.

The image data of the set original is subjected to image processing in the first image processing block 16 to obtain the processed image data and the characteristic data, which is then stored in the memory 4.

Depending on the color determination performed by the color determining unit 32 in the first image processing block 16, the CPU 3 determines the image processing tasks to be performed by the filter processing unit 42, the color correcting unit 43, and the gradation processing unit 45 for enhancing the image quality. More particularly, depending on the set image quality mode (a text mode, a photo mode, or a text/photo mode), image quality parameters specific to the text, the photo, or the text/photo are determined. For example, in the case of filter processing, a matrix coefficient parameter or a shape parameter is determined. In the case of color correction, a color saturation adjustment parameter is determined. In the case of gradation processing, a parameter such as a curve parameter of printer gamma correction or a matrix parameter of error diffusion is determined. When the color determining unit 32 determines that the set original is a color original, the parameters of the image quality mode for color original are set; while when the color determining unit 32 determines that the set original is a monochrome original, the parameters of the image quality mode for monochrome original are set.

Lastly, the image data and the characteristic data stored in the memory 4 is output to the second image processing block 17 for further image processing and then output to the writing unit 6 via the writing I/F unit 5 for producing a copy of the original on a recording medium.

In this way, according to the seventh embodiment, when automatic color determination is instructed from the operation display unit 7, the CPU 3 stores the image data processed only in the first image processing block 16 in the memory 4. Subsequently, the filter processing unit 42, the color correcting unit 43, and the gradation processing unit 45 in the second image processing block 17 perform image processing tasks based on whether the set original is a color original or a monochrome original as determined by the color determining unit 32 in the first image processing block 16. That is, if the set original is a color original, then image quality parameters in the second image processing block 17 are processed in the character/picture mode by taking into consideration the possibility that the set original includes a picture. On the other hand, if the set original is a monochrome original, then image quality parameters in the second image processing block 17 are processed in the character mode by taking into consideration the possibility that the set original includes a large number of characters. Such a configuration of the MFP 20 allows execution of a variety of user-requested functions at a low manufacturing cost.

Meanwhile, an image processing program executed in the MFP 20 is stored in the ROM 11 in advance.

Instead, it is also possible to store the image processing program executed in the MFP 20 as an installable and executable file in a computer-readable storage medium such as a compact disk read only memory (CD-ROM), a flexible disk (FD), a compact disk recordable (CD-R), or a digital versatile disk (DVD).

Moreover, the image processing program executed in the MFP 20 can be stored in a computer connected over a network such as the Internet and downloaded as per requirement. Furthermore, the image processing program executed in the MFP 20 can also be distributed via a network such as the Internet.

The image processing program executed in the MFP 20 includes modules for each of the shading processing unit 31, the color determining unit 32, and the image-area separating unit 33 in the first image processing block 16 and the density adjusting unit 41, the filter processing unit 42, the color correcting unit 43, the zoom processing unit 44, the gradation processing unit 45, and the editing unit 46 in the second image processing block 17. In practice, the CPU 3 reads the image processing program from the ROM 11 and executes the same such that the modules for each of the shading processing unit 31, the color determining unit 32, the image-area separating unit 33, the density adjusting unit 41, the filter processing unit 42, the color correcting unit 43, the zoom processing unit 44, the gradation processing unit 45, and the editing unit 46 are loaded and generated in a main storage unit (not shown).

According to an aspect of the present invention, the control unit can flexibly determine the image processing route or the connection pattern with the storage unit depending on the processing environment (type of image processing mode, reading speed of image reading unit, storage capacity, etc.), so that the image processing apparatus allows execution of a variety of user-requested functions at a low manufacturing cost.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image processing apparatus comprising:
an image reading unit that reads an image of an original to obtain image data;
a storing unit that stores therein the image data;
an image processing unit that performs an image processing on the image data from both of the reading unit and the storing unit;
a color-determination-mode setting unit that sets an automatic color determination mode for automatically determining whether the original is a color original or a monochrome original; and
a control unit that controls the image reading unit, the image processing unit, the storing unit, and the color-determination-mode setting unit, wherein
the image processing unit includes
a first image processing unit that processes the image data from the reading unit, and
a second image processing unit that selectively processes the image data directly from the first image processing unit and directly from the storing unit, wherein
the control unit selects a processing route from among a first image-processing route in which the image data is processed by the first image processing unit and the second image processing unit and is then stored in the storing unit and a second image-processing route in which the image data is once processed by the first image processing unit and stored in the storing unit, and then the image data from the storing unit is processed by the second image processing unit and stored in the storing unit, and determines a processing to be performed on the image data by the second image processing unit depending on a result of a processing performed on the image data by the first image processing unit, and
the control unit selects the processing route depending on a processing to be performed on the image data by the second image processing unit.

2. The image processing apparatus according to claim 1, wherein
the first image processing unit includes a determining unit that determines whether the original is a color original or a monochrome original,
the second image processing unit includes a color correcting unit that performs a color correction on the image data, and
when the automatic color determination mode is set by the color-determination-mode setting unit, the control unit stores the image data processed exclusively by the first image processing unit in the storing unit and the color correcting unit performs the color correction on the image data stored in the storing unit based on a result of a color determination by the determining unit.

3. The image processing apparatus according to claim 1, wherein
the first image processing unit includes a determining unit that determines whether the original is a color original or a monochrome original,
the second image processing unit includes a zoom processing unit that performs a zoom processing on the image data, and
when the automatic color determination mode is set by the color-determination-mode setting unit, the control unit stores the image data processed exclusively by the first image processing unit in the storing unit and the zoom processing unit performs the zoom processing on the image data stored in the storing unit based on a result of a color determination by the determining unit.

4. The image processing apparatus according to claim 1, wherein
the first image processing unit includes a determining unit that determines whether the original is a color original or a monochrome original,
the second image processing unit includes a density adjusting unit that performs an image density adjustment for detecting a fluctuation range of an image density of the original and adjusting the image density to be reproduced, and
when the automatic color determination mode is set by the color-determination-mode setting unit, the control unit stores the image data processed exclusively by the first image processing unit in the storing unit and the density adjusting unit performs the image density adjustment on the image data stored in the storing unit based on a result of a color determination by the determining unit.

5. The image processing apparatus according to claim 1, wherein
the first image processing unit includes a determining unit that determines whether the original is a color original or a monochrome original,
the second image processing unit includes a filter processing unit that performs a filter processing on the image data, and
when the automatic color determination mode is set by the color-determination-mode setting unit, the control unit stores the image data processed exclusively by the first image processing unit in the storing unit and the filter processing unit performs the filter processing on the image data stored in the storing unit based on a result of a color determination by the determining unit.

6. The image processing apparatus according to claim 1, wherein
the first image processing unit includes a determining unit that determines whether the original is a color original or a monochrome original,
the second image processing unit includes a gradation processing unit that performs a gradation processing on the image data, and
when the automatic color determination mode is set by the color-determination-mode setting unit, the control unit stores the image data processed exclusively by the first image processing unit in the storing unit and the gradation processing unit performs the gradation processing on the image data stored in the storing unit based on a result of a color determination by the determining unit.

7. The image processing apparatus according to claim 2, further comprising an image-quality mode selecting unit that selects an image quality mode based on the result of the color determination, wherein
the control unit controls the color correction based on the image quality mode.

8. The image processing apparatus according to claim 3, further comprising an image-quality mode selecting unit that selects an image quality mode based on the result of the color determination, wherein
the control unit controls the zoom processing based on the image quality mode.

9. The image processing apparatus according to claim 4, further comprising an image-quality mode selecting unit that selects an image quality mode based on the result of the color determination, wherein
the control unit controls the image density adjustment based on the image quality mode.

10. The image processing apparatus according to claim 5, further comprising an image-quality mode selecting unit that selects an image quality mode based on the result of the color determination, wherein
the control unit controls the filter processing based on the image quality mode.

11. The image processing apparatus according to claim 6, further comprising an image-quality mode selecting unit that selects an image quality mode based on the result of the color determination, wherein
the control unit controls the gradation processing based on the image quality mode.

12. An image processing method comprising:
reading an image of an original to obtain image data;
processing at least the image data read at the reading;
storing therein the image data processed at the processing;
setting an automatic color determination mode for automatically determining whether the original is a color original or a monochrome original; and
controlling the reading, the processing, the storing, and the setting, wherein
the processing includes
first processing the image data read at the reading, and
second processing either one of the image data stored at the storing and image data processed at the first processing,
the controlling includes
selecting a processing route from among a first image-processing route in which the image data is processed at the first processing and the second processing and is stored at the storing and a second image-processing route in which the image data is once processed at the first processing and stored at the storing, and then the image data stored at the storing is processed at the second processing and stored at the storing, and
determining a processing to be performed on the image data at the second processing depending on a result of a processing performed on the image data at the first processing, and
the controlling further includes selecting the processing route depending on a processing to be performed on the image data at the second processing.

* * * * *